(12) United States Patent
Hennecken et al.

(10) Patent No.: US 7,006,317 B1
(45) Date of Patent: Feb. 28, 2006

(54) DYNAMICALLY ALLOCATED PARALLEL EQUALIZATION AND DETECTION OF A PRML READ CHANNEL IN A MULTI-CHANNEL DRIVE

(75) Inventors: Mark Hennecken, Parker, CO (US); Richard A. Gill, Aruada, CO (US); Keith Boyer, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 233 days.

(21) Appl. No.: 10/729,646

(22) Filed: Dec. 5, 2003

(51) Int. Cl.
*G11B 5/035* (2006.01)

(52) U.S. Cl. .................................................. 360/65

(58) Field of Classification Search .................. None
See application file for complete search history.

(56) References Cited

U.S. PATENT DOCUMENTS 6,813,108 B1 * 11/2004 Annampedu et al. ......... 360/51

2005/0169412 A1 * 8/2005 Yang et al. ................. 375/350

* cited by examiner

*Primary Examiner*—David Hudspeth
*Assistant Examiner*—Dan I Davidson
(74) *Attorney, Agent, or Firm*—Brooks Kushman P.C.

(57) ABSTRACT

A tape drive for use with magnetic tapes includes a housing for receiving a magnetic tape having multiple parallel tracks, and a tape head for reading and writing the parallel tracks of the magnetic tape. A plurality of partial response maximum likelihood (PRML) equalization/detection channels are provided for processing the data signals to determine the data stream for each data signal. The plurality of PRML equalization/detection channels includes at least one PRML equalization/detection channel pre-assigned to each track. The plurality of PRML equalization/detection channels further includes at least one floating PRML equalization/detection channel dynamically assignable on an as-needed basis. The invention also contemplates an ASIC, a generic drive, and a PRML method.

24 Claims, 3 Drawing Sheets

Pre-assign at least one PRML equalization/detection channel to each track — 80

Dynamically assign floating PRML equalization/detection channel on as-needed basis — 82

DYNAMICALLY ALLOCATED PARALLEL EQUALIZATION AND DETECTION OF A PRML READ CHANNEL IN A MULTI-CHANNEL DRIVE

BACKGROUND OF THE INVENTION

1. Field of the Invention

The present invention relates to partial response maximum likelihood (PRML) methods and systems and to the use of tape drives and magnetic tapes to store data.

2. Background Art

In a traditional magnetic storage medium, a read circuit detects flux reversals to determine a data signal. Peak detection is used to interpret the information present in the data signal. As data areal density increases, the peaks get smaller and smaller relative to the background noise, and accordingly, get more and more difficult to detect. A technique used to allow further increases in data areal density that addresses difficulties associated with peak detection is partial response maximum likelihood (PRML).

PRML does not attempt to detect individual peaks in the way that the traditional peak detection techniques do. PRML uses digital signal processing to analyze the analog data signal from the read circuit to determine the most likely pattern of flux reversals. That is, PRML determines the most likely data stream based on the partial response observed in the analog data signal from the read circuit. PRML techniques have been quite successful in allowing the continued increase in areal data density for magnetic storage applications.

The use of tape drives and magnetic tapes to store data has become widespread. Tape drives have many advantages for certain storage applications in that they are able to meet the capacity, performance and reliability needs of these applications at an acceptable cost. A problem that occurs in tape drives is that the head to tape interface is not always consistent. The distance between the head and the tape can vary. In addition, the uniformity of the magnetic coating on the tape varies along the length of the tape. Further, head wear and tape wear result in further inconsistencies in the head to tape interface.

PRML approaches have been used in tape drive applications. The inconsistent head to tape interface causes error rates to increase dramatically in tape drive applications that rely on traditional PRML. To address the problem of increasing error rates, attempts have been made to employ parallel equalization and detection channels for each track of the tape. In this way, each of the parallel equalization/detection channels may be tuned to a different response to account for the inconsistent head to tape interface. Accordingly, the most likely data stream for a particular track is determined based on the observation of the several equalization/detection channels.

The equalization/detection capability for multiple parallel tracks may be provided in a single application specific integrated circuit (ASIC). The ASIC receives an input signal from the read circuit for each track being read in parallel. The input signals undergo common input signal conditioning. For each track input signal, there are multiple equalization/detection channels employed in parallel, each tuned to a different response, to account for inconsistent tape to head interfacing.

This approach of providing multiple parallel equalization and detection channels for each tape track does address the problem of errors due to inconsistent head to tape interfacing, however, as the number of parallel tracks on a tape increases, the difficulty in terms of cost and physical implementation for the application specific integrated circuit (ASIC) that performs that detection goes up significantly. Further, demands to reduce overall physical space for the tape drive components also add to the difficulty of providing multiple parallel equalization/detection channels for each tape track.

For the foregoing reasons, there is a need for an improved PRML method and tape drive that address head to tape interface inconsistencies and also address cost and physical implementation issues.

SUMMARY OF THE INVENTION

It is an object of the present invention to provide a tape drive for use with magnetic tapes, an ASIC, a generic drive, and a method that utilize a floating PRML equalization/detection channel that is dynamically assignable on an as-needed basis.

In carrying out the present invention, a tape drive is provided. The tape drive is for use with magnetic tapes. The tape drive comprises a housing and a tape head. The housing receives a magnetic tape having multiple parallel tracks. The tape head reads and writes the parallel tracks of the magnetic tape. Reading the parallel tracks produces a data signal for each track.

A plurality of partial response maximum likelihood (PRML) equalization/detection channels process the data signals to determine the data stream for each data signal. The plurality of PRML equalization/detection channels includes at least one PRML equalization/detection channel pre-assigned to each track. The plurality of PRML equalization/detection channels further includes at least one floating PRML equalization/detection channel dynamically assignable on an as-needed basis.

It is appreciated that the present invention may be employed for tapes having varying numbers of parallel tracks. For example, use of the present invention in tape drives having sixteen parallel tracks is contemplated, as is use of the present invention in tape drives having thirty-two parallel tracks.

In one application of the present invention, there are at least two PRML equalization/detection channels assigned to each track. In some applications, a floating PRML equalization/detection channel is dynamically assigned based on current per-track performance. Current per-track performance for a particular track may be determined based on error rate. In some applications, a floating PRML equalization/detection channel is pre-assigned to a default track based on an expectation of per-track performance. A track at the tape edge may be pre-assigned a floating PRML equalization/detection channel.

In a preferred embodiment, the PRML equalization/detection channels are contained in a single application specific integrated circuit (ASIC).

Further, in carrying out the present invention, an application specific circuit (ASIC) for use in a tape drive is provided. The tape drive includes a housing for receiving a magnetic tape having multiple parallel tracks and a tape head for reading and writing the parallel tracks of the magnetic tape. Reading the parallel tracks produces a data signal for each track. The ASIC comprises a plurality of partial response maximum likelihood (PRML) equalization/detection channels for processing the data signals to determine the data stream for each data signal. The plurality of PRML equalization/detection channels includes at least one PRML equalization/detection channel pre-assigned to each track. The plurality of PRML equalization/detection channels further includes at least one floating PRML equalization/detection channel dynamically assignable on an as-needed basis.

The various more detailed features comprehended by the present invention that were described previously for the tape drive may be suitable for use with the ASIC. That is, the ASIC may be employed for varying numbers of simultaneously readable/writable parallel tracks such as sixteen or thirty-two as described above. The media itself may have any number of tracks. In one application of the ASIC, there are at least two PRML equalization/detection channels assigned to each track. In some applications of the ASIC, a floating PRML equalization/detection channel is dynamically assigned based on current per-track performance. Current per-track performance for a particular track may be determined based on error rate. In some applications of the ASIC, a floating PRML equalization/detection channel is pre-assigned to a default track based on an expectation of per-track performance. A track at the tape edge may be pre-assigned a floating PRML equalization/detection channel.

Still further in carrying out the present invention, a drive for use with media is provided. The drive comprises a housing for receiving a medium having multiple parallel tracks, and a head for reading and writing the parallel tracks of the medium. Reading the parallel tracks produces a data signal for each track. A plurality of partial response maximum likelihood (PRML) equalization/detection channels are provided for processing the data signals to determine the data stream for each data signal. The plurality of PRML equalization/detection channels includes at least one PRML equalization/detection channel pre-assigned to each track. The plurality of PRML equalization/detection channels further includes at least one floating PRML equalization/detection channel dynamically assignable on an as-needed basis. The PRML equalization/detection channels are preferably contained in a single application specific integrated circuit (ASIC).

It is appreciated that the drive may take a variety of forms such as a magnetic disk or tape drive, or an optical media drive.

Yet further in carrying out the present invention, a partial response maximum likelihood (PRML) method for handling parallel tracks wherein reading the tracks produces a plurality of data signals is provided. A plurality of partial response maximum likelihood (PRML) equalization/detection channels are provided for processing the data signals to determine the data stream for each data signal. The method comprising pre-assigning at least one PRML equalization/detection channel to each track. The method further comprises dynamically assigning at least one floating PRML equalization/detection channel on an as-needed basis.

It is appreciated that methods of the present invention my incorporate various other more detailed aspects described previously. For example, a floating PRML equalization/detection channel may be dynamically assigned based on current per-track performance. Current per-track performance for a particular track may be determined based on error rate. For example, a floating PRML equalization/detection channel may be pre-assigned to a default track based on an expectation of per-track performance. A track at the tape edge may be pre-assigned a floating PRML equalization/detection channel.

The advantages associated with embodiments of the present invention are numerous. For example, embodiments of the present invention provide improved PRML methods, ASICs, generic drives, and tape drives. The tape drives in preferred embodiments address head to tape interface inconsistencies and also address cost and physical implementation issues.

DETAILED DESCRIPTION OF THE PREFERRED EMBODIMENT

Figure 1:
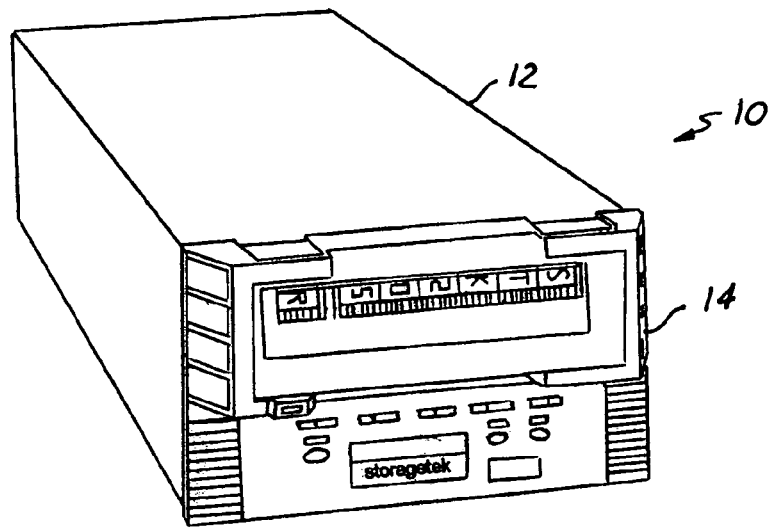
FIG. 1 is a tape drive made in accordance with the present invention.

With reference to FIG. 1, a tape drive is generally indicated at 10. Tape drive 10 includes a housing 12. Housing 12 is for receiving a magnetic tape cartridge 14. Magnetic tape cartridge 14 has multiple parallel tracks. The way that tape drive 10 reads and writes user data is best shown in FIG. 2.

Figure 2:
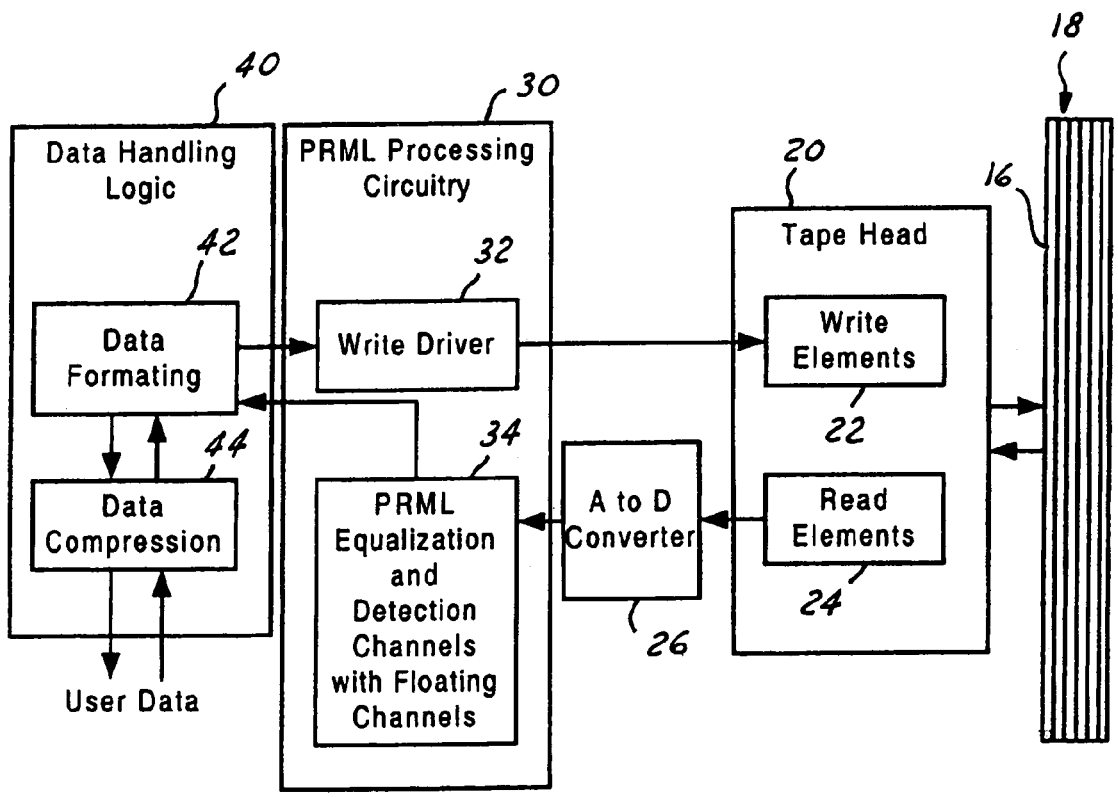
FIG. 2 is a block diagram illustrating the way the tape drive reads and writes user data.

In FIG. 2, media 16 which is contained within magnetic tape cartridge 14 includes multiple parallel tracks 18. The number of parallel tracks will vary depending on the application, as may various aspects of tape drive 10 and tape cartridge 14 that are simultaneously readable/writable. That is, the tape has hundreds of parallel tracks with a handful being written or read at one time in parallel.

Tape head 20 is for reading and writing the tracks 18 of media 16. Tape head 20 may take any suitable form. Writing is conducted with write elements 22, and reading is conducted with read elements 24. It is further appreciated that the read and write elements may take any suitable form. With continuing reference to FIG. 2, PRML processing circuitry 30 interfaces with the tape head components and provides appropriate PRML processing to decode the signals from the tape. A to D converter 26 converts the analog read signal to a series of digital values for processing by circuitry 30.

PRML processing circuitry 30 includes write driver 32 and PRML equalization/detection channels 34. The PRML processing circuitry 30 addresses the inconsistent head to tape interface by employing parallel equalization and detection channels for each track of the tape as it is read. Parallel channels for a particular track being read may be tuned to a different response to account for various forms of inconsistent tape to head interfacing. The most likely data stream for a particular track is determined based on the observation of the several equalization/detection channels. To address the cost and physical implementation difficulties as the number of parallel tracks being read increases, PRML processing circuitry 34 includes floating PRML equalization/detection channels in addition to any dedicated PRML equalization/detection channels.

Reading the parallel tracks produces an analog data signal for each track. Block 34 includes at least one PRML equalization/detection channel pre-assigned to each track. Block 34 further includes at least one floating PRML equalization/detection channel dynamically assignable on an as-needed basis. Data handling logic 40 handles data formatting (block 42) and data compression (block 44) in any suitable fashion.

Figure 3:
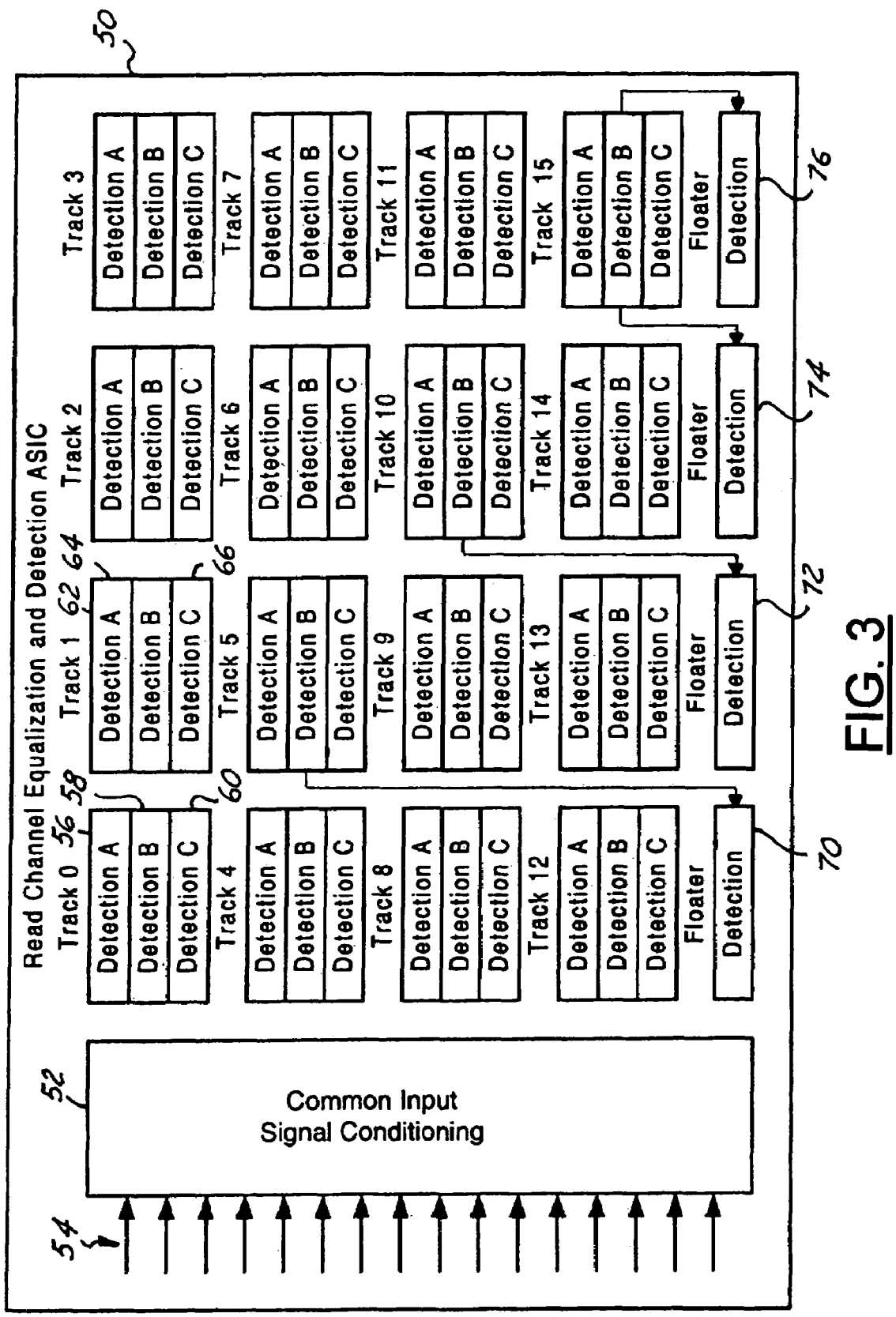
FIG. 3 illustrates a read channel equalization and detection ASIC.

With reference to FIG. 3, PRML equalization/detection channels 34 (FIG. 2) are preferably implemented in a single ASIC 50. ASIC 50 illustrates common input signal conditioning at block 52 for each incoming analog data signal 54 from the read elements 24. ASIC 50 includes the PRML equalization/detection channels for each track as well as the floating channels. In the illustrated ASIC 50, there are equalization/detection channels corresponding to sixteen parallel tracks. As shown, each track has three equalization/ detection channels pre-assigned thereto. For example, channels 56, 58, and 60 are assigned to Track 0. Channels 62, 64, and 66 are assigned to Track 1.

ASIC 50 further includes dynamically assignable floating channels 70, 72, 74, and 76. The floating channels are not dedicated to any particular tracks, but are allocated based on performance. In the illustrated example, each of the sixteen tracks are designed with three parallel equalization and detection channels that are fixed in their allocation. The additional floating channels including in ASIC 50 may be assigned to any particular tracks that are not performing as well as the others.

The assignment of the floating channels could be based on current per-track performance. For example, if the error rate for a given track is poorer than others or the Viterbi metrics are lower than the others, floating channels would be assigned accordingly. In the case where there is an expectation that certain tracks will exhibit weak performance, the floating channels could have default assignments based on an expectation of per-track performance. Of course, because the floating channels are dynamically assignable, any one or more of them could be later re-assigned if dictated by later per-track performance measurements.

An example of default floating channel assignment is that floating channels may be assigned to tracks near the edge of the tape where tape flutter requires a wider range of equalization options. This example is illustrated in FIG. 3 by the assignment of floating channels 74 and 76 to Track 15. FIG. 3 also illustrates the example of floating channel assignment based on performance in that floating channel 70 is assigned to Track 5 and floating channel 72 is assigned to Track 10. It is also possible to provide additional dedicated channels to tracks that are expected to need an additional equalization/ detection channel on an ongoing basis (for example, tracks near the tape edge). In this case, some tracks would have more dedicated equalization/detection channels than others, however, floating channels would still be available on an as-needed basis.

It is appreciated that embodiments of the present invention have a number of advantages. As the number of parallel tracks increase, the need to control costs and packaging considerations are met by using fewer dedicated detection channels. While at the same time, appropriate use of floating channels makes it possible to maintain performance.

Figure 4:
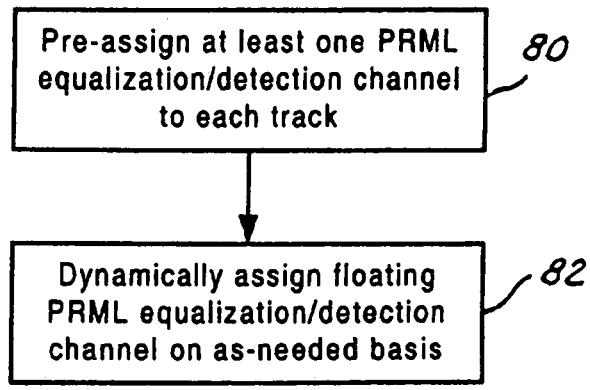
FIG. 4 illustrates a first method of the present invention.
Figures 5, 6:
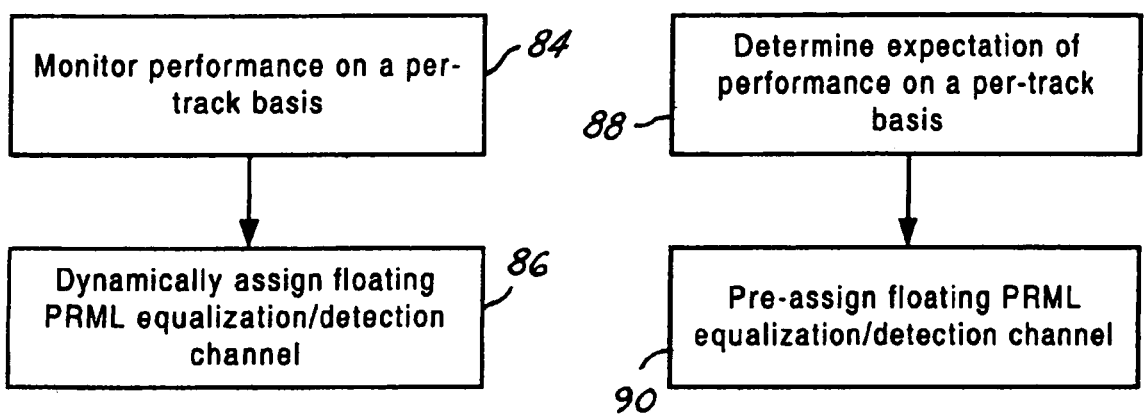
FIG. 5 illustrates a second method of the present invention.
FIG. 6 illustrates a third method of the present invention.

FIGS. 4–6 illustrate various method aspects of the present invention. FIG. 4 illustrates a first method of the present invention. Block 80 depicts pre-assigning at least one PRML equalization/detection channel to each track. Block 82 depicts dynamically assigning at least one floating PRML equalization/detection channel on an as-needed basis. FIG. 5 illustrates a second method. Block 84 depicts monitoring performance on a per-track basis. Block 86 depicts dynamically assigning floating PRML equalization/detection channels. FIG. 6 illustrates a third method. Block 88 depicts determining an expectation of per-track performance. Block 90 depicts pre-assigning floating PRML equalization/detection channels.

Further, it is appreciated that the present invention may be implemented in various forms including tape drives, other drives using PRML techniques, ASICs, and methods.

It is appreciated that floating channels used for a particular track are tuned so as to address the particular reading difficulty present. Floating channels could also be used to replace failed channels.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape drive for use with magnetic tapes, the tape drive comprising:
    a housing for receiving a magnetic tape having multiple parallel tracks;
    a tape head for reading and writing the parallel tracks of the magnetic tape, wherein reading the parallel tracks produces a data signal for each track;
    a plurality of partial response maximum likelihood (PRML) equalization/detection channels for processing the data signals to determine the data stream for each data signal;
    wherein the plurality of PRML equalization/detection channels includes at least one PRML equalization/ detection channel pre-assigned to each track; and
    wherein the plurality of PRML equalization/detection channels further includes at least one floating PRML equalization/detection channel dynamically assignable on an as-needed basis.

2. The tape drive of claim 1 wherein there are at least two PRML equalization/detection channels assigned to each track.

3. The tape drive of claim 1 wherein there are sixteen parallel tracks processed at a time.

4. The tape drive of claim 1 wherein there are thirty-two parallel tracks processed at a time.

5. The tape drive of claim 1 wherein a floating PRML equalization/detection channel is dynamically assigned based on current per-track performance.

6. The tape drive of claim 5 wherein current per-track performance for a particular track is determined based on error rate.

7. The tape drive of claim 1 wherein a floating PRML equalization/detection channel is pre-assigned to a default track based on an expectation of per-track performance.

8. The tape drive of claim 7 wherein a track at the tape edge is pre-assigned a floating PRML equalization/detection channel.

9. The tape drive of claim 1 wherein the PRML equalization/detection channels are contained in a single application specific integrated circuit (ASIC).

10. An application specific circuit (ASIC) for use in a tape drive, the tape drive including a housing for receiving a magnetic tape having multiple parallel tracks and a tape head for reading and writing the parallel tracks of the magnetic tape, wherein reading the parallel tracks produces a data signal for each track, the ASIC comprising:

plurality of partial response maximum likelihood (PRML) equalization/detection channels for processing the data signals to determine the data stream for each data signal;

wherein the plurality of PRML equalization/detection channels includes at least one PRML equalization/detection channel pre-assigned to each track; and wherein the plurality of PRML equalization/detection channels further includes at least one floating PRML equalization/detection channel dynamically assignable on an as-needed basis.

11. The ASIC of claim 10 wherein there are at least two PRML equalization/detection channels assigned to each track.

12. The ASIC of claim 10 wherein there are sixteen parallel tracks processed at a time.

13. The ASIC of claim 10 wherein there are thirty-two parallel tracks processed at a time.

14. The ASIC of claim 10 wherein a floating PRML equalization/detection channel is dynamically assigned based on current per-track performance.

15. The ASIC of claim 14 wherein current per-track performance for a particular track is determined based on error rate.

16. The ASIC of claim 10 wherein a floating PRML equalization/detection channel is pre-assigned to a default track based on an expectation of per-track performance.

17. The ASIC of claim 16 wherein a track at the tape edge is pre-assigned a floating PRML equalization/detection channel.

18. A drive for use with media, the drive comprising:

a housing for receiving a medium having multiple parallel tracks;

a head for reading and writing the parallel tracks of the medium, wherein reading the parallel tracks produces a data signal for each track;

a plurality of partial response maximum likelihood (PRML) equalization/detection channels for processing the data signals to determine the data stream for each data signal;

wherein the plurality of PRML equalization/detection channels includes at least one PRML equalization/detection channel pre-assigned to each track; and wherein the plurality of PRML equalization/detection channels further includes at least one floating PRML equalization/detection channel dynamically assignable on an as-needed basis.

19. The drive of claim 18 wherein the PRML equalization/detection channels are contained in a single application specific integrated circuit (ASIC).

20. A partial response maximum likelihood (PRML) method for handling parallel tracks wherein reading the tracks produces a plurality of data signals, and wherein a plurality of partial response maximum likelihood (PRML) equalization/detection channels are provided for processing the data signals to determine the data stream for each data signal, the method comprising:

pre-assigning at least one PRML equalization/detection channel to each track; and dynamically assigning at least one floating PRML equalization/detection channel on an as-needed basis.

21. The method of claim 20 wherein a floating PRML equalization/detection channel is dynamically assigned based on current per-track performance.

22. The method of claim 21 wherein current per-track performance for a particular track is determined based on error rate.

23. The method of claim 20 wherein a floating PRML equalization/detection channel is pre-assigned to a default track based on an expectation of per-track performance.

24. The method of claim 23 wherein a track at the tape edge is pre-assigned a floating PRML equalization/detection channel.

* * * * *